United States Patent Office 3,355,950
Patented Dec. 5, 1967

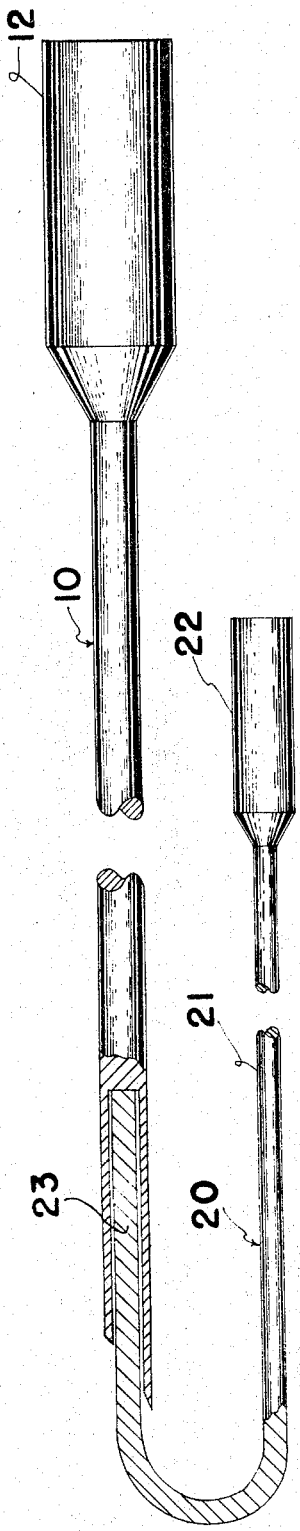
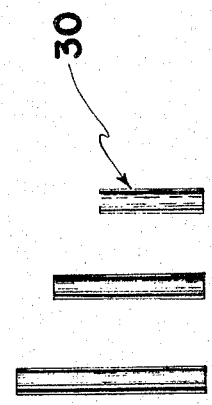
FIGURE 3
FIGURE 4

3,355,950
CHROMATOGRAPHIC SAMPLE INJECTION APPARATUS
Rano Joseph Harris, Sr., Baton Rouge, La., assignor to Precision Sampling Corporation, a corporation of Louisiana
Filed July 1, 1965, Ser. No. 468,743
6 Claims. (Cl. 73—422)

ABSTRACT OF THE DISCLOSURE

The invention contemplates injection apparatus having a forward portion or needle of substantially uniform cross-sectional diameter. The forward end of the needle is of tubular design so that the internal portion thereof provides a reservoir for containing measured quantities of fluids, and the extreme forward end of the needle terminutes in a point. The cross-sectional diameter of the reservoir and its length relative to the diameter are of critical dimensions. The total length of the needle, or portion of uniform cross-sectional diameter of the apparatus, also bears a critical length relative to the length of the reservoir so that the forward portion of the apparatus can be projected for sufficient depth through a septum and into the column of an analytical device for discharge of the fluid contents of the reservoir.

---

This invention relations to improvements in the art of dispensing fluids and more particularly to improvements in apparatus and apparatus combinations for introducing accurately measured quantities of fluids, especially liquids into various systems, especially the sample inlet systems of gas chromatographs.

Many applications require dispensing relatively small accurately measured quantities of fluid into a system. One such important application involves the delivery of micro quantities of fluids, particularly liquids, into an analytical device, e.g., a gas chromatograph. The gas chromatograph is composed of a chromatographic column containing appropriate solid packing material, such as crushed firebrick, through which a carrier fluid is passed at a uniform rate of flow. This carrier fluid, e.g., helium, nitrogen, or the like, transports the fluid to be analyzed through the column. Vaporization of the fluid is generally accomplished by heating the fluid at the time of injection by means of a heater positioned within a chamber which houses the column. The gaseous stream emerging from the chromatographic column, including the fluid sample and carrier gas, is introduced into a detector apparatus which measures a physical characteristic of the gas—e.g., thermal conductivity, density, charged particle ionization characteristics, infrared radiation adsorption, or the like.

A commonly used effluent detection device consists of a hydrogen flame ionization detector. In another device, the detector consists, e.g., of a means of measuring the thermal conductivity of the exit gas relative to that of the incoming carrier gas. Thus, e.g., as the different components of the sample appear in the exit helium carrier gas, the thermal conductivity will change. The identity of a compound in the sample causing a change in thermal conductivity is obtained by calibration of the apparatus with respect to time. For a given set of operating conditions, any single compound will have a characteristic time of appearance in the exit carrier gas relative to the time of injection of the sample. This information, e.g., change in thermal conductivity, obtained by the detector is customarily plotted against time. The amount of the compound in the sample can then be determined from the height or magnitude in the change recorded by the detector, or more properly can be obtained by the area under the curve which is a profile of a given compound.

Introduction of liquid samples into the carrier gas stream for vaporization and passage through the chromatographic column frequently involved use of common hypodermic needle syringes. The accuracy of such devices, inter alia, have left much to be desired. A significant step forward in the art of sample injection in gas chromatography is described in U.S. Letters Patent No. 2,991,647, granted July 11, 1961. The pipet described in that patent for introducing small fluid samples has been found in actual service to result in significant improvements in the accuracy, precision and reproducibility of analytical results as compared with the results achieved using the hypodermic needle mode of sample injection. A feature of the device is the provision therein of a capillary tube which opens at both ends, one end of the tube opening on a side wall. When the tube is filled with the sample to be dispensed the flow of carrier gas is temporarily interrupted, this imposing a force upon the liquid in the pipet so that the capillary tube is purged of its contents. The advantages of the capillary pipet introduction system are particularly evident when used with highly volatile samples such as pentane.

Despite these improvements several shortcomings still remained. First, improvements in the art led to the discovery that the use of chromatographic columns of smaller internal diameters gave rise to higher separation efficiencies reflected in terms of increased theoretical plates. To achieve these higher separation efficiencies, however, it became essential to introduce samples of less than about 5 microliters, and preferably less than about 1 microliter. The above described liquid pipet however, in the range of below about 2 microliters, resulted in significant loss of analytical precision and accuracy. Furthermore, when utilizing liquid samples of high viscosity the probability of analytical error was higher than desired, irrespective of sample size. Such new difficulties were then overcome by providing the art with a new injection apparatus wherein a thin-walled capillary tube of small diameter is mounted on the forward end of a shaft of larger diameter. The internal opening of the capillary tube which contains the sample to be dispensed is contiguous to and in alignment with the axis of the shaft. In effect then, the small tube is sealed at one end by abutment with the shaft and the forward end is open to receive and dispense a sample. Such apparatus is described in my copending application Ser. No. 272,335, filed April 11, 1963; now Patent No. 3,205,711.

While highly successful a notable deficiency of all such injection apparatus, however, is that none are suitable for dispensing a sample through the rubber septum of the sample vaporization chamber of a chromatograph through which a carrier gas is flowed. All require introduction through special externally mounted sample vaporization chambers provided with special valve arrangements, pumping stations and the like. There is yet an acute need for an improved, simplified, sample injection device capable of providing the foregoing advantages without the inherent disadvantages. It is accordingly the primary objective of this invention to fulfill the foregoing need by providing the art with an effective and efficient apparatus, and apparatus combination, for overcoming these and related deficiencies associated with the injection of relatively small samples, especially into the gas chromatograph. In particular, it is an object to provide a novel sample injector which is especially suitable for dispensing fluids, especially liquids ranging from about 0.2 to about 5 microliters. More particularly, it is an object to improve the accuracy and precision of the analytical results from gas chromatography as applied to fluid samples by effecting and providing improvements in the techniques and apparatus for injecting such samples into the sample vaporization chamber of the gas chromatograph. Another object is to provide an auxiliary apparatus, or apparatus combination useful in filling and injecting fluids from the novel injector. Other objects will be apparent from the ensuing description and the accompanying drawings.

Referring to the drawings.

FIGURE 3 shown, in partial section, the injector device of the foregoing in combination with a preferred filling device; and FIGURE 4 is shown a set of plugs, of different sizes, for use in combination with the injector for providing accurately measured quantities of fluid for dispensing.

Figure 1:
FIGURE 1 illustrates a preferred injector in accordance with this invention.

Referring to FIGURE 1 is shown an injector 10 consisting of an elongated or cylindrical member 11 provided with a handle 12. The handle 12 is not essential but is preferable, and it is also preferable to provide handle 12 in generally axial alignment with cylindrical member 11 and attached to the end thereof.

Figure 2:
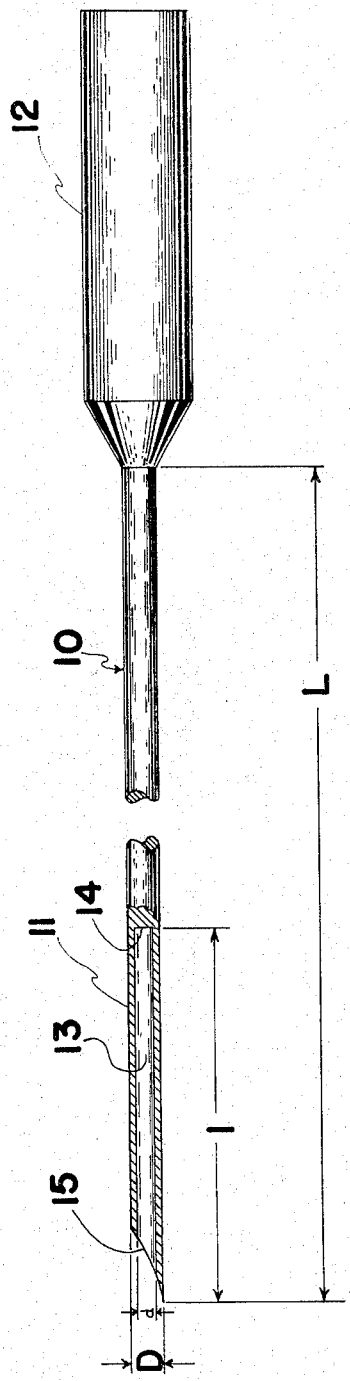
FIGURE 2 is an enlarged partial sectional view of the essential portions (including a tubular opening) of the injector, the section being taken along a vertical longitudinal plane of the injector.

The details of the device are shown by reference to FIGURE 2, particularly to that portion of the device shown in section, which constitutes the sample dispensing end of the injector 10. At the forward end of cylindrical member 11, or needle 11, is provided a recessed portion, tubular or capillary opening 13 of substantially uniform diameter formed by the enclosing walls of needle 11. The thin-walled capillary opening 13 is sealed or closed at one end 14, but open at the other end 15, which end is bevelled or tapered, and preferably hollow ground, as shown, to form a point for ease of penetration through a septum. Preferably the capillary opening 13 has a capacity of from about 0.2 microliter to about 5 microliters, and more preferably from about 0.25 microliter to about 2 microliters. Also, the length $l$ of the opening ranges from about 10 to about 200 times, and more preferably from about 20 to about 50 times, its cross-sectional diameter $d$. Thus, the ratio of $l:d$ ranges from about 10:1 to about 200:1, and preferably 20:1 to 50:1. Moreover, the length L of needle 11 is longer than the length $l$ and preferably L is from about 0.1 to about 100 times, and more preferably from about 2 to about 10 times, the length $l$. The longer lengths L are preferred so that the needle 11 when passed through a septum will extend the opening 13 sufficiently far into the chromatograph that the sample contained therein will be adequately dispensed or injected. The diameter D of the needle 11 is determined by the thickness of the walls forming the opening. This diameter D is generally only slightly larger than diameter $d$ so as to obtain good heat transfer characteristics, this being related generally to the materials of construction. Generally outer diameter D does not exceed two times the internal diameter $d$.

Handle 12 can be permanently attached to the end of needle 11 or detachably mounted thereon. It is generally preferable to provide permanent attachment. Attachment, however, is readily accomplished by providing threads on at least one end of the exterior surface of needle 11 which mate with a corresponding female thread located within a cylindrical opening of suitable depth within the handle 12. Alternatively, a cylindrical recess may be provided in the end of handle 12 which is of essentially the same diameter and circumference as the outer diameter and circumference of needle 11. In this way the capillary tube is simply pressed into the cylindrical recess to a suitable depth thereby providing an appropriate means of detachment. Other means of effecting either type of attachment will be evident to those skilled in the art.

In preferred form, needle 11 is made of alloy steel or other suitable metal which has good structural strength at temperatures ranging as high as 500° C., is essentially inert to chemical interaction with the liquid samples to be associated therewith, and which has the property of good heat conductance. Illustrative of suitable metals possessing these characteristics are copper-nickel alloys, silver, nickel, platinum, titanium, and the like. Stainless steel is particularly preferred from the standpoints of readily availability, low cost, and optimum structural and sufficient heat transfer properties. In actual practice needles of length ranging from about 3 to about 10 inches, with a capillary opening ranging from about 0.254 to about 1 inch in length and from about 0.005 to about 0.02 inch in inner diameter have afforded excellent results. The thickness of the walls of the capillary opening can range from about 0.001 to about 0.05 inch with the range of from about 0.005 to about 0.025 inch being most suitable. Although the inner diameter $d$ of the capillary opening 13 can vary along its length $l$ in most preferred form the capillary opening is substantially uniform in dimensions along its length, not only in inner diameter, but in wall thickness as well. In actual practice a capillary opening 0.39 inch long; having an inner diameter of 0.013 inch, an outer diameter of 0.028 inch, and a capacity of 1 microliter; and made from stainless steel (316 SS) has been found to give excellent results in the injection of samples ranging from inert hydrocarbons (carbon numbers ranging from about 5 to about 40, etc.) to reactive substances such as mercaptans, aldehydes, organic acids, and the like.

In operation needle 11 of the injector 10 of this invention is passed through a septum and into a sample inlet system of a gas chromatograph so that the sample carrying end 15 of the injector (filled with the sample, preferably utilizing the filling apparatus and techniques to be described hereinafter) is placed in operative relationship with the sample vaporization chamber which leads into the chromatographic column (not shown). Heat from sample vaporization chamber is transferred through the thin walls forming the capillary opening 13, and thence into the sample contained therein. Because of the particular configuration of capillary opening 13, the microsized sample is suddenly and substantially uniformly vaporized. The resultant vapors build up a momentary pressure within the capillary and this pressure causes the contents to be expelled through this open end of the capillary, this expulsion occurring as a surge or plug of vapors. In short, substantially the entire sample is expelled uniformly and rapidly into the vaporization chamber and thence into the chromatographic column so that such undesirable phenomena as sample fractionation, slow diffusion, etc., are markedly suppressed or eliminated. The net result is that extremely accurate and precise analyses are feasible even when using extremely small-sized samples.

Another aspect of this invention is that it provides means and techniques for filling the above-described injector 10 with accurately measured quantities of fluid. Referring to FIGURE 3 is shown an injector 10 within the forward opening 13 of which is located the end portion 23 of a filling member 20. It is to be noted that the end portion 23 is the terminal portion of a bent rod-like member 21 which is attached to a handle 22. The end portion 23 of member 20 comprises a cylindrical portion which mates with capillary opening 13. By placing the opening 13 within a source of fluid which is to constitute a sample, and by reciprocation of the end portion 23 within the opening 13 air can be displaced and the entire opening 13 filled with the fluid to be dispensed. Thus, upon removal of the end portion 23 at the last reciprocation the opening 13 will be devoid of air and completely filled with the sample fluid.

The foregoing thus describes means for completely filling the opening 13 with a small accurately measured quantity of fluid. In yet another preferred technique, however, the same opening 13 can be provided with even smaller accurately measured quantities of fluid for dispensing. In accordance therewith once the opening 13 has been filled and member 20 removed, a small calibrated cylindrical plug such as shown in FIGURE 4 can be utilized. These plugs 30 are of smaller volume than that of the opening 13, and can be inserted therein to displace a portion of the fluid. The amount of fluid remaining within opening 13 for dispensing will be the difference in the volume of the opening 13 and the volume of the particular plug 30. Any size plug 30 can be used up to and including one having an external diameter equal to the internal diameter of opening 13, and of sufficient length to occupy the full length of the opening 13. The latter sized plug is admirably suited to provide for the dispensing of an extremely small accurately measured quantity of fluid, i.e., ony the quantity of fluid which wets the annulus between the plug and the walls of opening 13. The plugs 30 can be smooth as shown, or recessed in portions, as desired.

Having described the invention what is claimed is:

1. In apparatus for direct injection of small accurately measured quantities of fluid into a system the combination comprising
    an elongated member of substantially uniform cross-section containing at its forward end a recessed portion which extends from the tip of the member to a location intermediate the opposite end of the member, said recessed portion providing an opening of substantially uniform cross-section, a length ranging from about 10 to about 200 times the inside cross-section of the opening, the over-all length of the elongated member is greater than the length of the recessed portion, and
    a mating solid member for fitting into the recessed portion of the elongated member.

2. In apparatus for direct injection of small accurately measured quantities of fluid into a system the combination comprising
    a cylindrical member with a forward tubular opening of substantially uniform cross-sectional diameter extending from the forward end of the member to a location intermediate the opposite end of the member, the length of the tubular opening ranging from about 10 to about 200 times the internal diameter of the opening, the over-all length of the cylindrical member is greater than the length of the opening, and
    a mating cylindrical member for fitting into the tubular opening.

3. The apparatus of claim 2 wherein the mating cylindrical member is the terminal portion of a curved larger member.

4. The apparatus of claim 2 wherein the length of the tubular opening ranges from about 20 to 50 times the cross-sectional diameter of the tubular opening.

5. The apparatus of claim 2 wherein the volume of the tubular opening ranges from about 0.2 to about 5 microliters.

6. The apparatus of claim 2 wherein the cylindrical member is provided with a handle on its end opposite the tubular opening.

References Cited
UNITED STATES PATENTS

| | | | |
|---|---|---|---|
| 2,839,152 | 6/1958 | Tracht | 73—422 X |
| 3,205,711 | 9/1965 | Harris | 73—422 |

LOUIS R. PRINCE, *Primary Examiner.*

S. C. SWISHER, *Assistant Examiner.*